US011981005B2

(12) United States Patent
Kuriki et al.

(10) Patent No.: US 11,981,005 B2
(45) Date of Patent: May 14, 2024

(54) DRIVING TOOL

(71) Applicant: MAKITA CORPORATION, Anjo (JP)

(72) Inventors: Shun Kuriki, Anjo (JP); Masaya Nagao, Anjo (JP); Kiyonobu Yoshikane, Anjo (JP); Toshiro Hirayama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 48 days.

(21) Appl. No.: 17/953,420

(22) Filed: Sep. 27, 2022

(65) Prior Publication Data

US 2023/0125450 A1 Apr. 27, 2023

(30) Foreign Application Priority Data

Oct. 26, 2021 (JP) ................................ 2021-174426

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/04; B25C 1/06; B25C 1/041; B25C 1/043; B25C 1/00; B25C 1/008
See application file for complete search history.

(56) References Cited

U.S. PATENT DOCUMENTS

| | | | | |
|---|---|---|---|---|
| 10,875,166 | B2 | 12/2020 | Ueda | |
| 10,946,506 | B1 | 3/2021 | Ueda | |
| 11,273,545 | B2 | 3/2022 | Ueda | |
| 2012/0322605 | A1* | 12/2012 | Hirabayashi | B25B 21/02 475/149 |
| 2016/0229043 | A1* | 8/2016 | Wyler | B25C 1/06 |
| 2018/0133877 | A1 | 5/2018 | Ueda | |
| 2021/0069883 | A1 | 3/2021 | Ueda | |
| 2021/0197350 | A1* | 7/2021 | Umino | B25C 1/06 |
| 2021/0197352 | A1 | 7/2021 | Ueda | |
| 2021/0387318 | A1 | 12/2021 | Ueda | |

* cited by examiner

*Primary Examiner* — Veronica Martin
(74) *Attorney, Agent, or Firm* — Oliff PLC

(57) ABSTRACT

A rotary shaft is spline coupled to a carrier of a final-stage planetary gear mechanism. A bearing for supporting the rotary shaft is arranged on an outer circumferential side of the carrier. The bearing and the carrier are arranged so as to overlap in a direction perpendicular to a motor axis.

17 Claims, 9 Drawing Sheets

DRIVING TOOL

CROSS-REFERENCE TO RELATED APPLICATIONS

This application claims priority to Japanese patent application serial number 2021-174426, filed Oct. 26, 2021, the content of which is incorporated herein by reference in its entirety for all purposes.

BACKGROUND

The present invention relates to driving tools. Driving tools may serve, for example, to drive fasteners, such as nails or staples, into, for example, wood.

Driving tools may include a gas-spring type driving tool utilizing the thrust of a compression gas as an impact force. A gas-spring type driving tool includes a piston moving up and down within a cylinder, and a driver that is coupled to and integrally moves downward with the piston to strike fasteners. The piston and the driver move downward in a driving direction due to gas pressure in an accumulation chamber. The piston and the driver are returned in a counter-driving direction by a lifter mechanism.

The lifter mechanism may include a wheel having a plurality of engagement portions to be engaged with portions-to-be-engaged provided at the driver. The wheel is rotated by an electric motor. The wheel rotates after a driving operation. This allows the engagement portions of the wheel to sequentially engage with the portions-to-be-engaged of the driver. As a result, the driver moves upward in the counter-driving direction. Moving the piston upward in the counter-driving direction causes the pressure of the gas in the accumulation chamber to increase. When the engagement of the lifter mechanism is released from the driver after it has moved upward to an upper motion end position, the driver moves downward due to the gas pressure and performs a driving operation.

For the lifter mechanism, the wheel may be rotatably supported by a rotary shaft. Output of the electric motor is transmitted to the rotary shaft via a reduction gear. The rotary shaft may be supported by a mechanism case via two bearings, so as to be rotatable about an axis. However, since a lower bearing of the two bearings is disposed between the wheel and the reduction gear, it has been difficult to downsize the lifter mechanism in a motor axis direction.

SUMMARY

According to one aspect of the present disclosure, a driving tool may include, for example, a piston configured to move in a driving direction due to gas pressure, a driver that moves integrally with the piston to strike fasteners, and a lifter mechanism to allow the driver to move in a counter-driving direction. The lifter mechanism may include, for example, an electric motor, a planetary gear mechanism configured to reduce the output speed of the electric motor, and a rotary shaft coupled to a carrier of the planetary gear mechanism, the rotary shaft being configured to be rotated by the electric motor. The lifter mechanism may also include, for example, a bearing configured to rotatably support the rotary shaft at an outer circumferential side of the carrier. The lifter mechanism may also include a wheel supported by the rotary shaft and engaged with the driver. This structure results in the downsizing of the lifter mechanism in the motor axis direction.

DETAILED DESCRIPTION

According to an aspect of the present disclosure, a rotary shaft, a carrier, and a bearing may be arranged, for example, on the same plane orthogonal to a motor axis of an electric motor. The rotary shaft, the carrier, and the bearing can thus be compactly arranged in the motor axis direction.

According to another aspect of the present disclosure, the planetary gear mechanism is a multiple-stage planetary gear mechanism with each stage arranged, for example, in series. For instance, a ring gear (i.e. internal gear) of a final-stage of the planetary gear mechanism may be supported by a metal mechanism case, which also accommodates the wheel. This allows the ring gear of the final-stage of the planetary gear mechanism to be firmly supported.

According to another aspect of the present disclosure, the rotary shaft and the carrier may be coupled, for example, by a spline fitting. This allows the rotation output of the electric motor to be more efficiently transmitted to the rotary shaft.

According to another aspect of the present disclosure, the spline fitting may be, for example, a major-diameter spline fitting (i.e., spline fitting of a large-diameter alignment). This allows the rotation output of the electric motor to be transmitted more effectively to the rotary shaft.

According to another aspect of the present disclosure, the multiple stages of the planetary gear mechanism may be arranged, for example, in series. For instance, upstream planetary gear mechanisms, for example the stages that exclude the final-stage, of the planetary gear mechanism may be accommodated within a resin gear case. This achieves a reduction in weight of the lifter mechanism.

According to another aspect of the present disclosure, the multiple stages of the planetary gear mechanism may be arranged, for example, in series. For instance, the ring gear of the final-stage of the planetary gear mechanism may be restricted from being displaced in the motor axis direction, for instance, by an outer ring of the bearing. This achieves a simplification of the structure.

According to another aspect of the present disclosure, a contact portion, which is configured to come in contact with a side of the outer ring of the bearing, may be provided at a side of the ring gear so as to project in the motor axis direction. This ensures proper clearance between the ring gear and the bearing, such that interference of the planetary gear with the bearing can be avoided.

Figure 1:
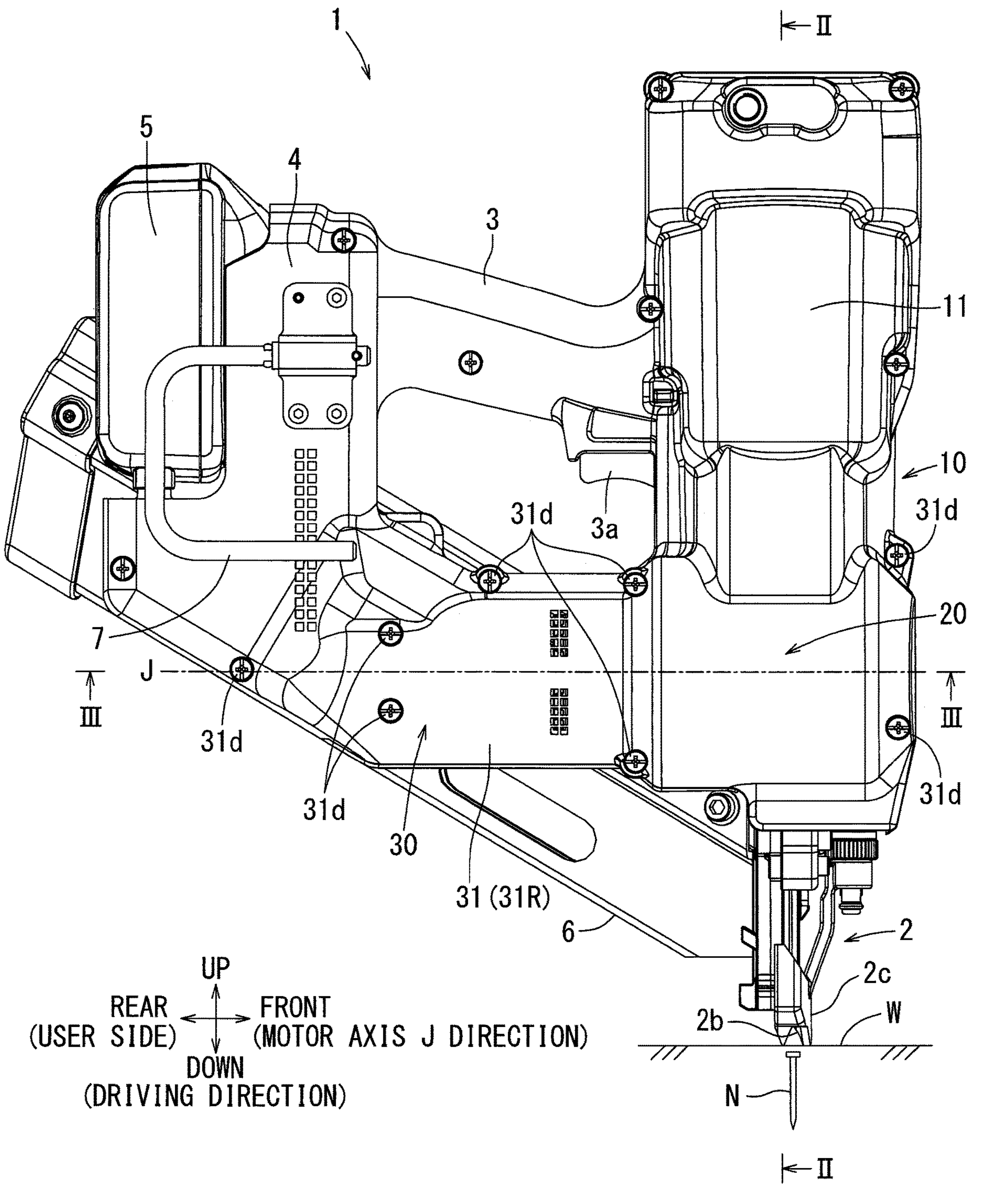
FIG. 1 is a right side view of a driving tool.

FIG. 1 shows a gas-spring type driving tool as one example of a driving tool. This gas-spring type driving tool utilizes gas pressure in a cylinder upper chamber as a thrust for driving a fastener N. In the following description and as shown in each figure, a lower side represents a driving direction of the fastener N while an upper side represents a counter-driving direction. A driver 15, which will be described later, moves downward to drive a fastener N and returns upward after driving. A user of a driving tool 1 is usually positioned substantially on the left side of the driving tool 1 in FIG. 1. The side just in front of the user is described as a rear side (user side) and a side frontward of that is described as a front side. Further, a user is used as a reference point for a left-right direction as used herein.

Figure 2:
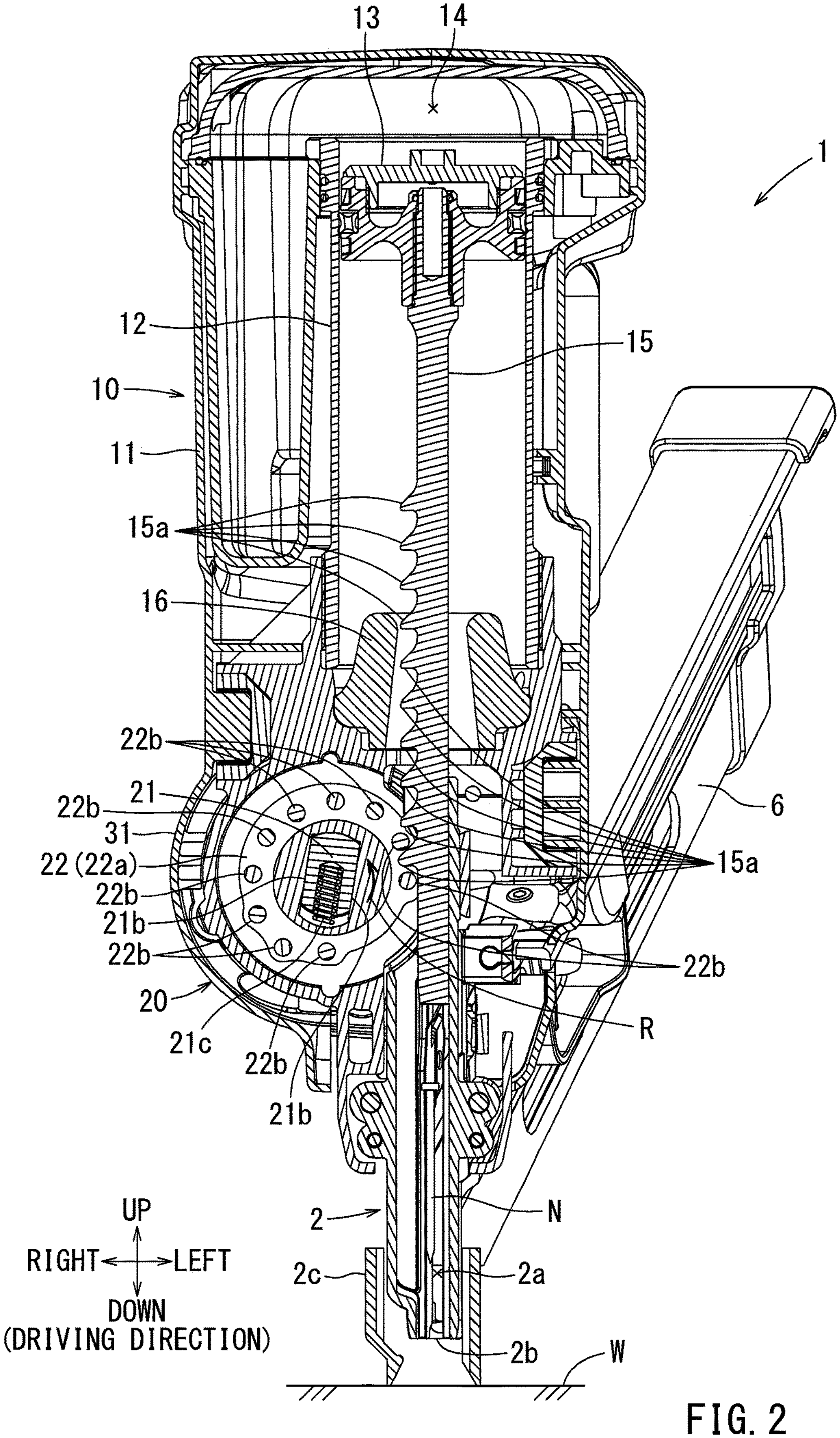
FIG. 2 is a vertical sectional view of a tool main body taken along a line II-II of FIG. 1.

As shown in FIGS. 1 and 2, the driving tool 1 includes a main body 10. The main body 10 includes a substantially cylindrical main body housing 11 and a cylinder 12 accommodated within the main body housing 11. A piston 13 is received within the cylinder 12 so as to be reciprocally movable in the up-down direction. An upper part of the cylinder 12 communicates with an accumulation chamber 14. The pressure of a gas within the accumulation chamber 14 acts as a thrust force on a top side of the piston 13.

As shown in FIG. 2, a single long driver 15 is coupled to a bottom side of the piston 13. The driver 15 extends downward. The lower side of the driver 15 enters a driving channel 2*a* of a driving nose 2 provided at a lower side of the main body 10. The driver 15 moves downward within the driving channel 2*a* due to the pressure of the gas in the accumulation chamber 14 acting on the top side of the piston 13. This causes the driver 15 to strike one fastener N. FIG. 2 shows a state in which one fastener N is fed into the driving channel 2*a*. The fastener N struck by the driver 15 is ejected from an ejection port 2*b* of the driving nose 2. The ejected fastener N is driven into a workpiece W. FIG. 1 shows a state in which the fastener N has been driven into the workpiece W. A downward motion end damper 16, which is configured for absorbing impact at a downward motion end of the piston 13, is arranged at a lower part of the cylinder 12.

As shown in FIG. 2, a contact arm 2*c* is provided at a lower part of the driving nose 2 and around the ejection port 2*b* such that the contact arm 2*c* can be displaced in the up-down direction. An arm portion of the contact arm 2*c* extends upward and reaches the vicinity of a switch lever 3*a* (see FIG. 1). The driving tool 1 may be pressed down while the contact arm 2*c* is in contact with a driving area of the workpiece W. This allows the contact arm 2*c* to move upward relative to the driving nose 2. The upward movement operation of the contact arm 2*c* is one of the conditions for starting the driving operation. This prevents an inadvertent driving operation.

As shown in FIG. 1, a grip 3 for a user to grasp is provided at a side of the main body 10. A switch lever 3*a* for a user to pull with his/her fingertip is provided on a front lower side of the grip 3. A battery mount 4 is provided at a rear part of the grip 3. A battery pack 5 is attached to the battery mount 4. An actuator 30, which will be described later, is operated by the electric power from the battery pack 5, which serves as a power source in this embodiment. A hanger hook 7 is provided at a side of the battery mount 4.

As shown in FIGS. 1 and 2, a magazine 6 is coupled to a lower side of the driving nose 2. A plurality of fasteners N loaded into the magazine 6 are fed one by one into the driving channel 2*a* in conjunction with the driving operation.

As shown in FIG. 2, a lifter mechanism 20 is coupled near an upper side of the driving nose 2. The lifter mechanism 20 serves to move the piston 13 and the driver 15 integrally upward after striking the fastener N. Moving the piston 13 upward by the lifter mechanism 20 increases the gas pressure within the accumulation chamber 14.

Figure 3:
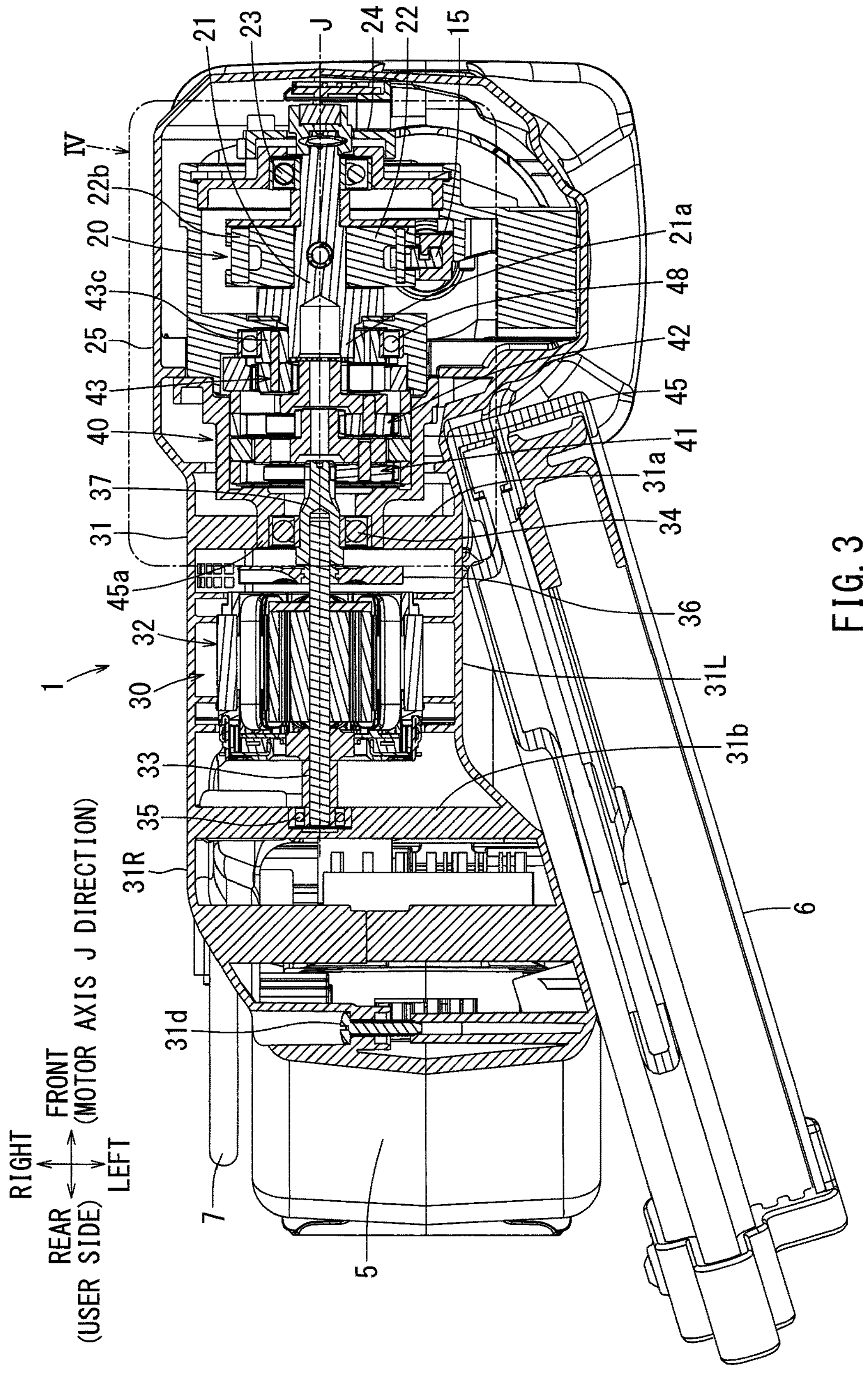
FIG. 3 is a transverse sectional view of a lifter mechanism taken along line III-III of FIG. 1.

As shown in FIG. 3, the actuator 30 and a reduction gear 40 are arranged in series in the front-rear direction in the lifter mechanism 20. The lifter mechanism 20 is operated by the actuator 30 via the reduction gear 40. The actuator 30 includes an electric motor 32. The electric motor 32 is accommodated in a actuator case 31 that extends over an area between the lifter mechanism 20 and a lower part of the battery mount 4. The actuator case 31 may be in a substantially L-shape. The actuator case 31 is integrally provided with the main body housing 11. The main body housing 11 and the actuator case 31 have a left-right split-in-half structure. FIG. 3 and FIG. 6 to FIG. 8 show that the actuator case 31 has a split-in-half structure in which a right half split case 31R and a left half split case 31L are coupled with a plurality of screws 31*d* while being butted against each other. The actuator case 31 extends forward. The reduction gear 40 and the lifter mechanism 20 are accommodated in the actuator case 31 at a front side thereof.

The electric motor 32 is arranged so as to be oriented along the front-rear direction such that the axis of the motor shaft 33 (motor axis J) is orthogonal to the driving direction (direction orthogonal to a sheet surface in FIG. 3). The electric motor 32 is initiated with electric power from, for example, the battery pack 5 as a power source. As described above, the electric motor 32 is initiated by pulling the switch lever 3*a*, and in some situations provided that other conditions are also met as may depend on the driving mode.

As shown in FIG. 3, the motor shaft 33 of the electric motor 32 is rotatably supported by the actuator case 31 via bearings 34, 35. The front bearing 34 is held on a front partition wall 31*a* of the actuator case 31. The rear bearing 35 is held on a rear partition wall 31*b* of the actuator case 31. The actuator case 31 serves as a motor case, for instance between the front and rear partition walls 31*a*, 31*b*.

A cooling fan 36 and a drive gear 37 are coupled at a front part of the motor shaft 33. The front side of the motor shaft 33 is supported by the front bearing 34 via the drive gear 37. The drive gear 37 projects forward from the front partition wall 31*a*. A portion of the drive gear 37 projecting forward is connected to the reduction gear 40.

Figure 4:
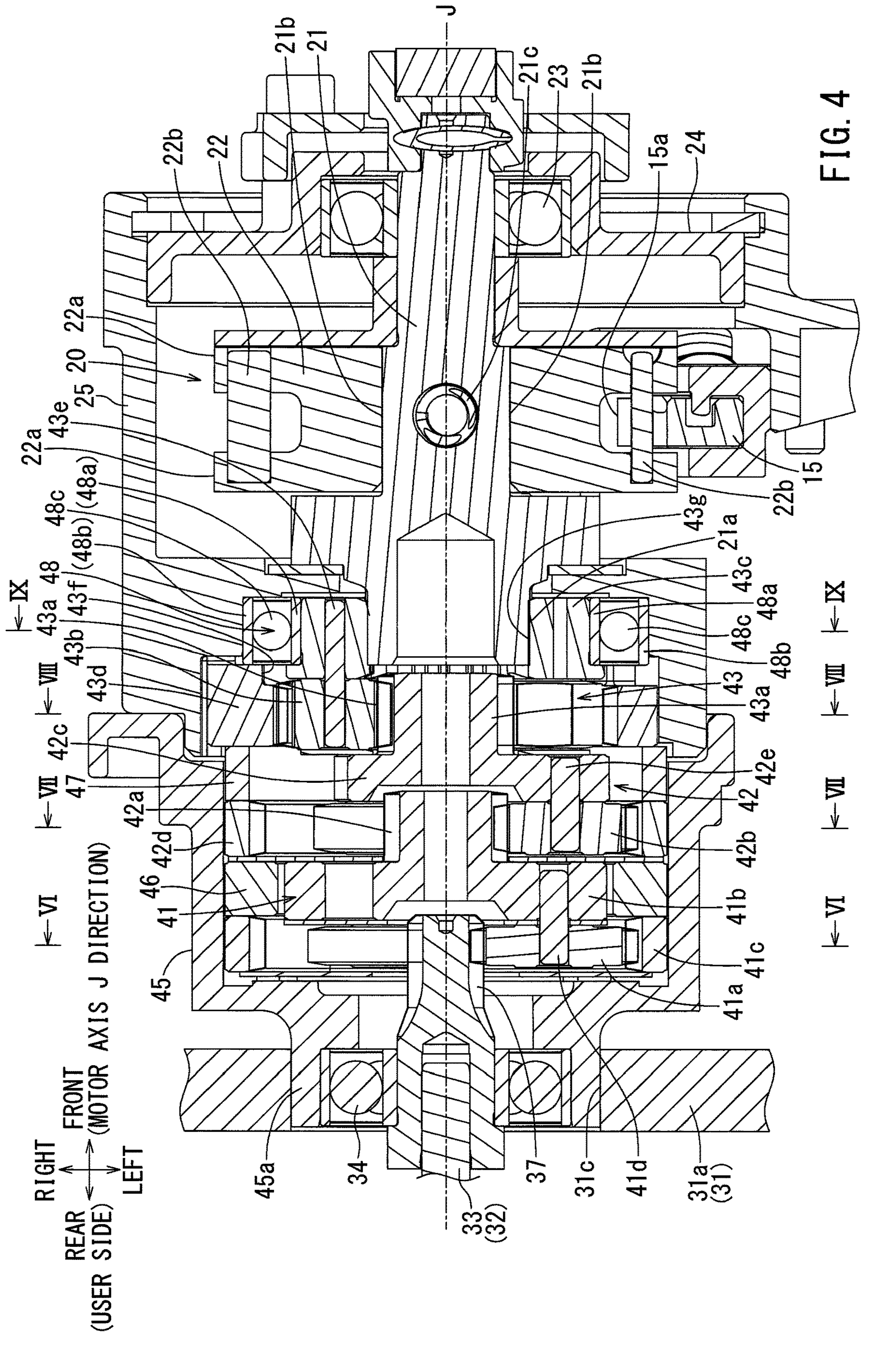
FIG. 4 is an enlarged view of the lifter mechanism and a speed reduction portion of area IV in FIG. 3.

FIG. 4 shows an embodiment of the reduction gear 40 in detail. The reduction gear 40 of this embodiment includes three stages of planetary gear mechanisms 41, 42, 43. The three stages of planetary gear mechanisms 41, 42, 43 are generally accommodated within a resin gear case 45. A rear part 45*a* of the gear case 45 has a cylindrical shape. The cylindrical rear part 45*a* of the gear case 45 is interposed and coupled between an outer circumferential side of the front bearing 34 and a retainer hole 31*c* of the partition wall 31*a*. The gear case 45 is covered by the actuator case 31.

Figure 5:
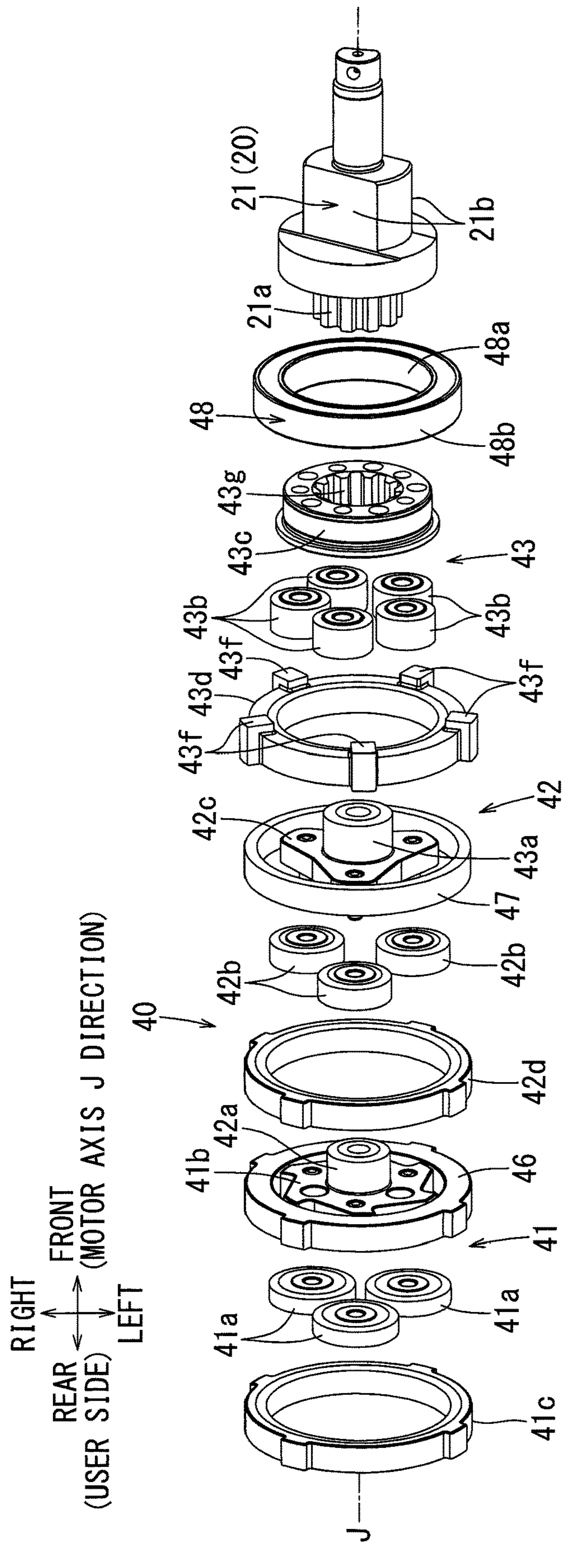
FIG. 5 is an exploded perspective view of the speed reduction portion.
Figure 6:
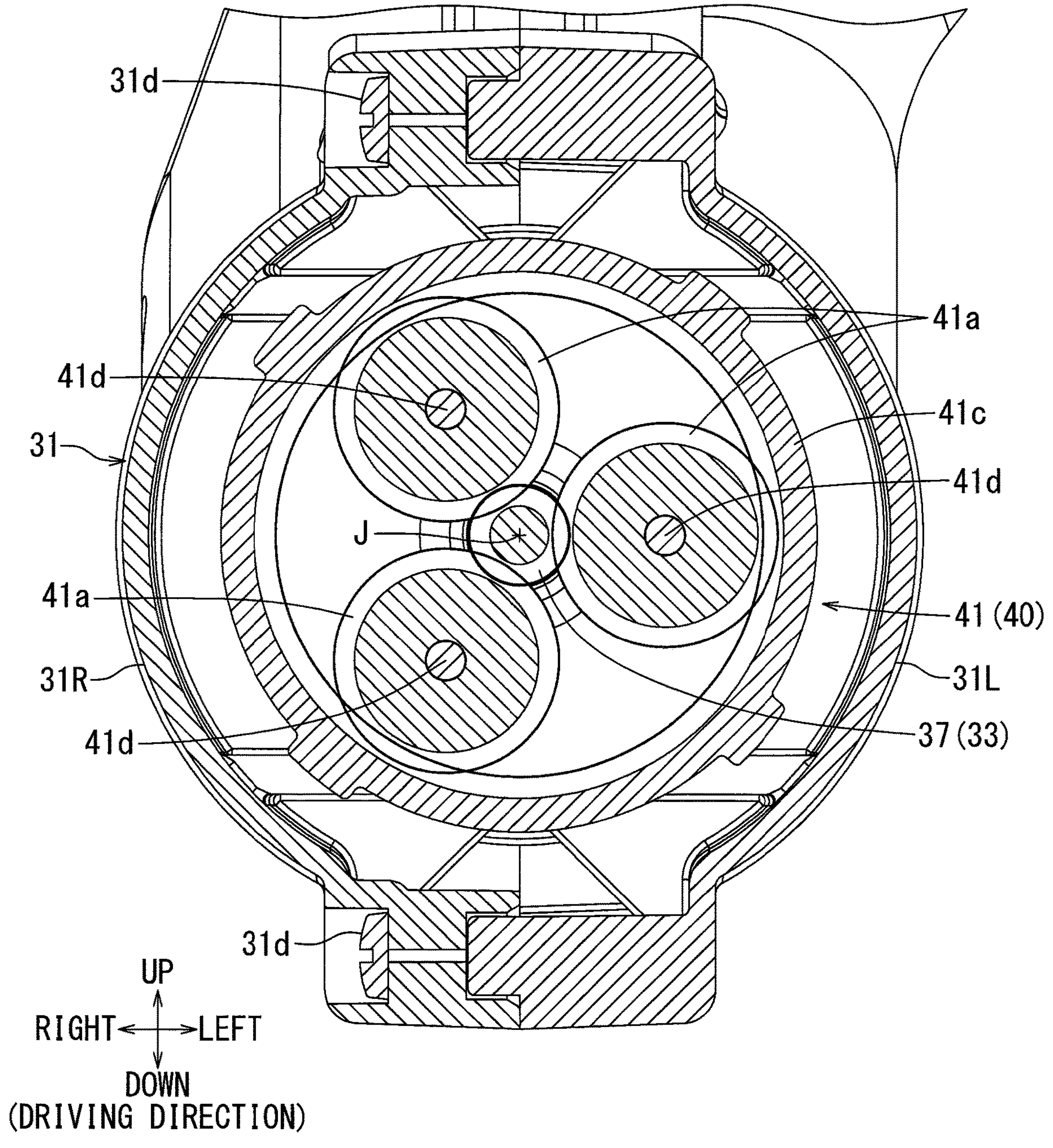
FIG. 6 is a transverse sectional of a first-stage planetary gear mechanism taken along line VI-VI of FIG. 4.

The three stages of planetary gear mechanisms 41, 42, 43 are coaxially arranged (in series) with the motor axis J. As shown in FIGS. 4, 5, and 6, a first-stage planetary gear mechanism 41 on an upstream side (rear side) includes three planetary gears 41*a*, one carrier 41*b*, and one internal gear (i.e., ring gear or internal ring gear) 41*c*. The three planetary gears 41*a* mesh with the drive gear 37. The drive gear 37 corresponds to a sun gear of the first-stage planetary gear mechanism 41. As shown in FIG. 4, the internal gear 41*c* is fixed along an inner surface of the gear case 45. The three planetary gears 41*a* mesh with the internal gear 41*c*. Each of the three planetary gears 41*a* is rotatably supported by the carrier 41*b* via a support shaft 41*d*.

Figure 7:
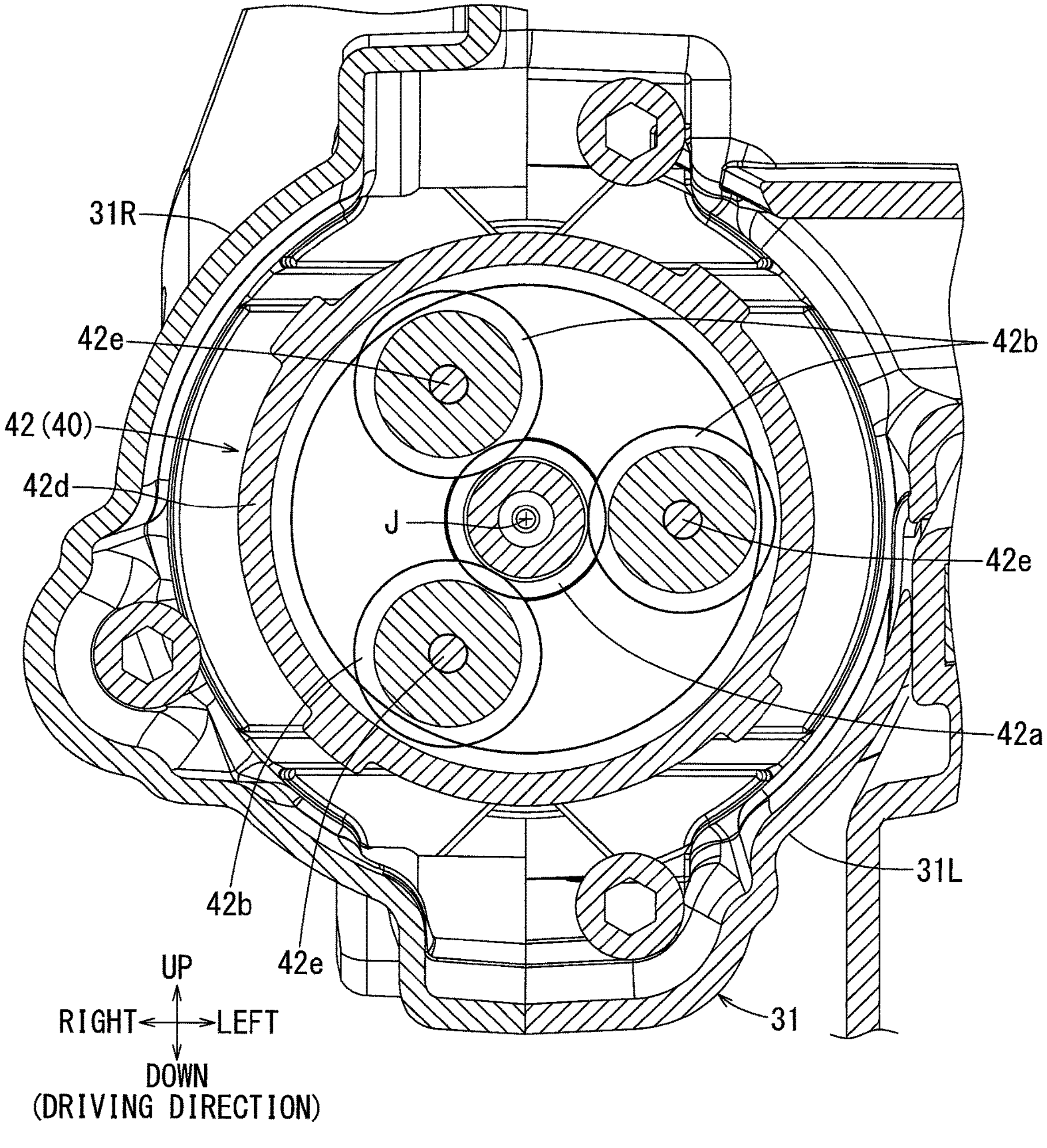
FIG. 7 is a transverse sectional view of a second-stage planetary gear mechanism taken along line VII-VII of FIG. 4.

A sun gear 42*a* of the second-stage planetary gear mechanism 42 is integrally formed at a front side of the carrier 41*b* of the first-stage planetary gear mechanism 41. As shown in FIGS. 4, 5, and 7, three planetary gears 42*b* mesh with the sun gear 42*a*. Each of the three planetary gears 42*b* is rotatably supported by a carrier 42*c* via a support shaft 42*e*. The three planetary gears 42*b* mesh with the one internal gear (i.e., ring gear or internal ring gear) 42*d*. As shown in FIG. 4, the internal gear 42*d* is fixed along an inner side of the gear case 45. An annular interposing member 46 is held between the internal gear 42*d* of the second-stage planetary gear mechanism 42 and the internal gear 41*c* of the first-stage planetary gear mechanism 41. This restricts the displacement of the internal gears 41*c*, 42*d* in the direction of the motor axis J.

Figure 8:
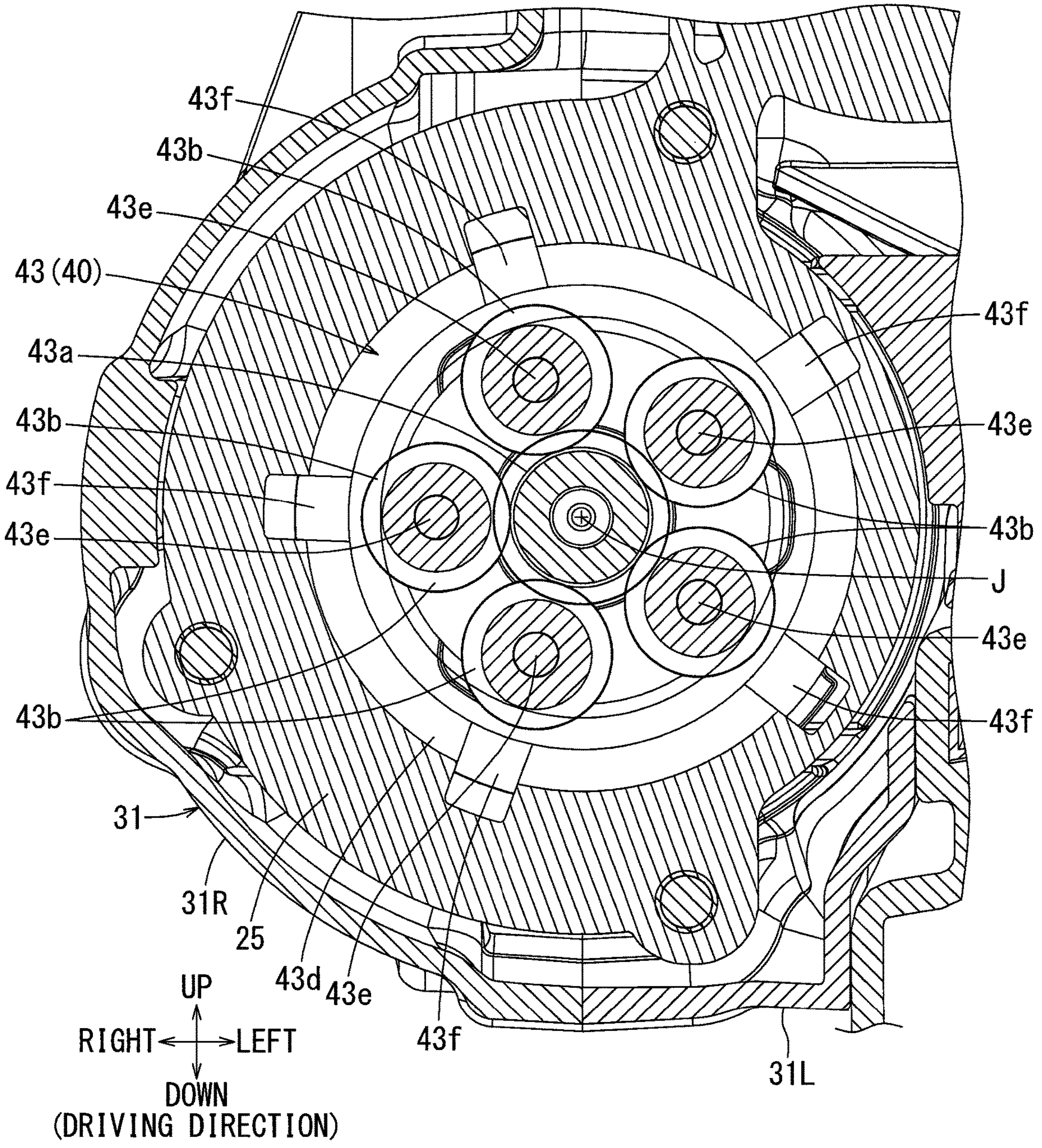
FIG. 8 is a transverse sectional view of a final-stage planetary gear mechanism taken along line VIII-VIII of FIG. 4.

A sun gear 43*a* of a third-stage planetary gear mechanism 43 is integrally formed at the front side of the carrier 42*c* of the second-stage planetary gear mechanism 42. As shown in FIGS. 4, 5, and 8, five planetary gears 43*b* mesh with the sun gear 43*a*. Each of the five planetary gears 43*b* is rotatably supported by the carrier 43*c* via a support shaft 43*e*. The five planetary gears 43*b* mesh with the one internal gear (i.e., ring gear or internal ring gear) 43*d*.

As shown in FIG. 4, the internal gear 43*d* of the third-stage planetary gear mechanism 43 is fixed along an inner circumference of the mechanism case 25 of the lifter mechanism 20. An annular interposing member 47 is held between the internal gear 43*d* of the third-stage planetary gear mechanism 43 and the internal gear 42*d* of the second-stage planetary gear mechanism 42. This restricts the displacement of the internal gears 42*d*, 43*d* in the direction of the motor axis J.

Figure 9:
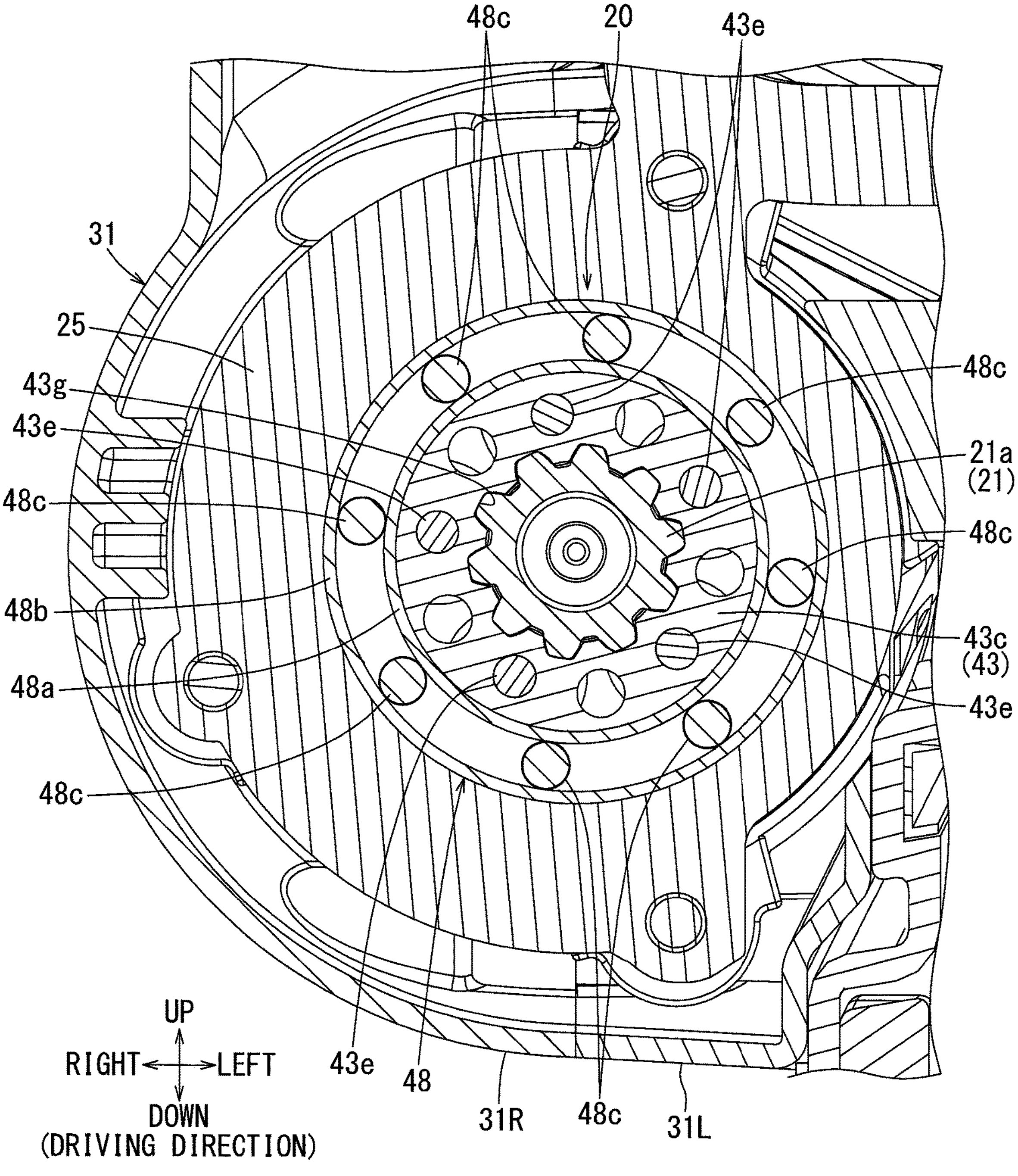
FIG. 9 is a transverse sectional view of a spline coupling portion taken along line IX-IX of FIG. 4.

As shown in FIGS. 4 and 9, the carrier 43*c* of the third-stage planetary gear mechanism 43 is rotatably supported by the mechanism case 25 via a bearing 48. Therefore, the third-stage planetary gear mechanism 43 is supported by the mechanism case 25. The mechanism case 25 of this embodiment is made of an aluminum alloy and has a cylindrical shape. As shown in FIGS. 3 and 4, a rear side of the mechanism case 25 enters a front inner circumferential side of the gear case 45. As a result, the mechanism case 25 and the gear case 45 are coupled and coaxially aligned with the motor axis J.

As shown in FIGS. 4, 5, and 9, in the present embodiment, a ball bearing with a plurality of steel balls 48*c* interposed between an inner ring 48*a* and an outer ring 48*b* is used for the bearing 48. The outer ring 48*b* of the bearing 48 is in contact with the internal gear 43*d* of the third-stage planetary gear mechanism 43. Five contact portions 43*f* are provided at the front side of the internal gear 43*d* so as to project forward one step farther. The five contact portions 43*f* are arranged at five equally divided locations in the circumferential direction. The outer ring 48*b* is in contact with the front side of the contact portions 43*f*. This avoids interference between the bearing 48 and the five planetary gears 43*b* when they revolve around the motor axis J.

A rotary shaft 21 of the lifter mechanism 20 is coupled to the carrier 43*c* of the third-stage planetary gear mechanism 43. A rear spline shaft portion 21*a* of the rotary shaft 21 is fitted into a spline hole 43*g* of the carrier 43*c*. The spline fitting allows the rotary shaft 21 to integrally rotate with the carrier 43*c* about the motor axis J. In the present embodiment, the spline shaft portion 21*a* of the rotary shaft 21 is spline fitted into the spline hole 43*g* of the carrier 43*c* by large-diameter alignment (i.e. major-diameter spline fitting) (former JIS standard D2001). Therefore, as shown in FIG. 9, a large-diameter surface of the spline shaft portion 21*a* (outer circumferential surface of teeth) is in contact with a bottom surface of the spline hole 43*g*. The rotation output of the electric motor 32 is output to the rotary shaft 21 of the lifter mechanism 20 via the spline fitting of the carrier 43*c*. The third-stage planetary gear mechanism 43 corresponds to the final-stage planetary gear mechanism of the reduction gear 40 of this embodiment.

As shown in FIGS. 3 and 4, the lifter mechanism 20 includes the rotary shaft 21 connected to the reduction gear 40 and includes a wheel 22 supported by the rotary shaft 21. A rear side of the rotary shaft 21 is coupled to the carrier 43*c* by spline-fitting. The carrier 43*c* is rotatably supported by the mechanism case 25 via the above-mentioned bearing 48. The bearing 48 is held at an outer circumferential side of the carrier 43*c* of the third-stage planetary gear mechanism 43. Thus, the bearing 48 is arranged so as to overlap the carrier 43*c* in a direction perpendicular to the direction of the motor axis J. The bearing 48, the carrier 43*c*, and the rear part of the rotary shaft 21 are thus aligned on the same plane orthogonal to the motor axis J. In other words, the bearing 48, the carrier 43*c*, and the rear part of the rotary shaft 21 overlap as viewed from the direction orthogonal to the motor axis J.

According to this arrangement structure of the bearing 48, the lifter mechanism 20 can be downsized. In contrast, according to a conventional structure, the rear part of the rotary shaft is directly inserted into the inner ring of the bearing so as to be held. With this conventional structure, the carrier and the bearing are arranged side by side in the direction of the motor axis J (without overlapping in the direction perpendicular to the motor axis J). This necessitates more space along the direction of the motor axis J.

As shown in FIG. 4, a front side of the rotary shaft 21 is rotatably supported by the mechanism case 25 via the bearing 23. A front part of the mechanism case 25 is closed with a cover 24. The front bearing 23 is held by the cover 24. An axis of rotation of the rotary shaft 21 coincides with the motor axis J.

When the electric motor 32 is initiated, a wheel 22 of the lifter mechanism 20 rotates. The wheel 22 rotates counterclockwise as indicated by an arrow R in FIG. 2. As shown in FIGS. 2, 3, and 4, the wheel includes two flanges 22*a* that are parallel to each other and are spaced apart by a predetermined interval. A plurality of engagement portions 22*b* are provided with both ends supported by and aligned between circumferential edges of the two flange portions 22*a*. A columnar shaft member (pin) is used for each of the engagement portions 22*b*.

A left part of the wheel 22 enters the driving channel 2*a*. Each of the engagement portions 22*b* of the wheel 22 is configured to engage with portions-to-be-engaged 15*a* of the driver 15. A plurality of portions-to-be-engaged 15*a* are arranged in a longitudinal direction (up-down direction) of the driver 15 at predetermined intervals. Each of the portions-to-be-engaged 15*a* is configured to have a rack-tooth shape and is provided so as to extend to the side.

As shown in FIG. 2, the piston 13 and the driver 15 are held at an upper standby position in an standby state. In the standby state, the electric motor 32 can be initiated by pulling the switch lever 3*a*. The initiation of the electric motor 32 causes the wheel 22 to rotate, for instance, counterclockwise. As a result, engagement between the engagement portions 22*b* of the wheel 22 and the portions-to-be-engaged 15*a* of the driver 15 is released. This allows the piston 13 and the driver 15 to move downward due to the gas pressure within the accumulation chamber 14. As the driver 15 moves downward within the driving channel 2*a*, one fastener N is struck and driven out from an ejection port 2*b*.

After the fastener N has been driven out of the ejection port 2*b*, the initiated state of the electric motor 32 is maintained and the wheel 22 continues to rotate. As a result, the engagement portions 22*b* again engage the portions-to-be-engaged 15*a* of the driver 15. The driver 15 and the piston 13 return toward the upper standby position as the wheel 22 rotates and the engagement portions 22*b* are successively engage portions-to-be-engaged 15*a*. The electric motor 32 may stop when the driver 15 and the piston 13 have arrived at the standby position, for example, by appropriately controlling a period of time from the initiation of the electric motor 32. A series of driving operations is thus completed.

Referring to FIG. 2, the wheel is supported by the rotary shaft 21 and is displaceable in a radial direction of the rotary shaft 21. The rotary shaft 21 is provided with two flat support faces 21*b* facing each other. The supporting faces 21*b* are configured to support the wheel 21 so that the wheel 21 is displaceable in the radial direction of the rotary shaft 21. Mutually parallel flat faces are provided on a support hole for the wheel 22. The support faces 21*b* of the rotary shaft 21 are slidably in contact with the flat faces of the support hole. The wheel 22 is thus supported by the rotary shaft 21 so that the wheel 22 is displaceable in the radial direction of the rotary shaft 21 within a predetermined range. As the wheel 22 is displaced in the radial direction with respect to the rotary shaft 21, an abnormal reaction force from the portions-to-be-engaged 15*a* on the engagement portions 22*b* is buffered, such that a normal meshed state between the two can be restored. The radial displacement of the wheel 22 is restored to an initial position by a compression spring 21*c*.

According to the above-described driving tool 1, as shown in FIG. 4, the rear bearing 48, which is configured to support the rotary shaft 21, is held on the outer circumferential side of the carrier 43*c* of the final-stage planetary gear mechanism 43. It is thus possible to downsize the lifter mechanism 20 in the direction of the motor axis J. For instance, this downsizing may be accomplished by arranging the bearing 48 such that it overlaps the outer circumferential side of the carrier 43*c* in the direction perpendicular of the motor axis J.

As shown in FIG. 4, three components, such as the spline shaft portion 21*a* of the rotary shaft 21, the carrier 43*c*, and the bearing 48, are arranged side by side on the same plane orthogonal to the motor axis J. This allows the rotary shaft 21, the carrier 43*c*, and the bearing 48 to be compactly arranged in the direction of the motor axis J.

As shown in FIG. 4, the third-stage (e.g., the final-stage) planetary gear mechanism 43 is supported by the metal mechanism case 25. The final-stage planetary gear mechanism 43 is thus firmly supported and has greater protection against vibration and impact.

As shown in FIG. 9, the rotary shaft 21 and carrier 43*c* are coupled by a spline fitting. This allows the rotation output of the electric motor 32 to be efficiently transmitted to the rotary shaft 21. In particular, the rotation output of the electric motor 32 can be more efficiently transmitted to the rotary shaft 21 since the spline fitting has a major-diameter spline fitting (i.e., large-diameter alignment).

As shown in FIG. 4, the upstream first- and second-stage planetary gear mechanisms 41, 42, for instance the planetary gear stages excluding the final-stage planetary gear mechanism 43, of the three stages of the planetary gear mechanisms 41, 42, 43 of the reduction gear 40 are accommodated within the resin gear case 45. This helps achieve a reduction in weight of the reduction gear 40.

As shown in FIG. 4, the outer ring 48*b* of the bearing 48 of the final-stage planetary gear mechanism 43 prevents the internal gear 43*d* of the final-stage planetary gear mechanism 43 from being displaced in the direction of the motor axis J. As a result, a simplified configuration may be achieved, as compared with a configuration in which a restriction member is separately provided.

As shown in FIG. 4, contact portions 43*f* are provided on a side of the internal gear 43*d* of the final-stage planetary gear mechanism 43 so as to project one step higher. The outer ring 48*b* of the bearing 48 comes in contact with the contact portions 43*f*. This helps ensure an appropriate clearance between the internal gear 43*d* and the bearing 48, such that, for example, interference between the planetary gear 43*b* and the bearing 48 may be avoided.

Various modifications may be made to the above-described embodiments. For example, the above-described reduction gear 40 includes three stages of planetary gear mechanisms 41, 42, 43. Instead, the reduction gear may have a single stage (in which case the single stage could be deemed the final-stage of the planetary gear mechanism) or two stages of planetary gear mechanisms or may have four or more stages of planetary gear mechanisms. The arrangement structure of the illustrated bearing 48 may also be applied to these modified reduction gears.

Although a configuration in which the wheel 22 is coupled to the rotary shaft 21 so as to be displaceable in the radial direction has been illustrated, this displacement allowing structure may be omitted.

Although a configuration in which the bearing 48 is a ball bearing has been illustrated, the same general configurations may be applied to a case where a roller bearing is used.

Although a configuration in which the rotary shaft 21 is coupled to the carrier 43*c* of the final-stage planetary gear mechanism 43 via a spline fitting of a large-diameter alignment has been illustrated, the spline fitting may be modified to a teeth-face alignment spline fitting. Further, the rotary shaft may be coupled to the final-stage planetary gear mechanism by a coupling means different from a spline fitting, such as, for example, press-fitting or screw coupling.

The driving tool 1 according to the embodiments is one example of a driving tool in one aspect of the present disclosure. The piston 13 according to the embodiments is one example of a piston in one aspect of the present disclosure. The driver 15 according to the embodiments is one example of a driver in one aspect of the present disclosure.

The lifter mechanism 20 according to the embodiments is one example of a lifter mechanism in one aspect of the present disclosure. The electric motor 32 according to the embodiments is one example of an electric motor in one aspect of the present disclosure. The planetary gear mechanisms 41, 42, 43 according to the embodiments are one example of planetary gear mechanisms in one aspect of the present disclosure. The carrier 43*c* according to the embodiments is one example of a carrier in one aspect of the present disclosure.

The rotary shaft 21 according to the embodiments is one example of a rotary shaft in one aspect of the present disclosure. The bearing 48 according to the embodiments is one example of a bearing in one aspect of the present disclosure. The wheel 22 according to the embodiments is one example of a wheel in one aspect of the present disclosure.

What is claimed is:

1. A driving tool, comprising:

a piston configured to move in a driving direction due to a gas pressure;

a driver configured to move integrally with the piston in the driving direction to strike a fastener; and a lifter mechanism configured to move the driver in a direction opposite to the driving direction, wherein:

the lifter mechanism includes:

an electric motor;

a final-stage planetary gear mechanism (i) configured to reduce an output speed of the electric; motor and (ii) including a carrier;

a rotary shaft (1) that is a separate component from the carrier, (ii) coupled to the carrier, (iii) configured to be rotated by the electric; motor and (iv) having an axis of rotation;

a bearing (i) configured to rotatably support the rotary shaft and (ii) at an outer circumference of the carrier; and a wheel supported by the rotary shaft and configured to engage the driver;

one end of the rotary shaft is in the carrier such that the rotary shaft extends from the carrier in only one direction along the axis of rotation; and the one end of the rotary shaft, the carrier and the bearing overlap in a radial direction from the axis of the rotation.

2. The driving tool according to claim 1, wherein the rotary shaft, the carrier, and the bearing are on a plane orthogonal to a motor axis of the electric motor.

3. The driving tool according to claim 1, wherein:

a ring gear of the final-stage planetary gear mechanism is supported by a metal mechanism case; and the metal mechanism case is configured to accommodate the wheel.

4. The driving tool according to claim 1, wherein the rotary shaft and the carrier of the final-stage planetary gear mechanism are coupled by a spline fitting.

5. The driving tool according to claim 4, wherein the spline fitting is a major-diameter spline fitting.

6. The driving tool according to claim 1, wherein:

the lifter mechanism further comprises a non-final-stage planetary gear mechanism;

the final-stage and non-final-stage planetary gear mechanisms are in series; and the non-final-stage planetary gear mechanism is in a resin gear case.

7. The driving tool according to claim 1, wherein:

the lifter mechanism further comprises a non-final-stage planetary gear mechanism;

the final-stage and non-final-stage planetary gear mechanisms are series; and a ring gear of the final-stage planetary gear mechanism is restricted from being displaced in a direction of a motor axis of the electric motor by an outer ring of the bearing.

8. The driving tool according to claim 7, wherein:

a side of the ring gear includes a contact portion that projects in the direction of the motor axis; and the contact portion is configured to contact a side of the outer ring of the bearing.

9. The driving tool according to claim 1, wherein a ring gear of the final-stage planetary gear mechanism directly contacts an outer ring of the bearing.

10. A driving tool, comprising:

a piston configured to move in a driving direction due to a gas pressure;

a driver configured to move integrally with the piston in the driving direction to strike a fastener; and a lifter mechanism configured to move the driver in a direction opposite to the driving direction, wherein:

the lifter mechanism includes:

an electric motor;

a final-stage planetary gear mechanism (i) configured to reduce an output speed of the electric motor; and (ii) including a carrier;

a rotary shaft (i) that is a separate component from the carrier, (ii) coupled to the carrier, and (iii) configured to be rotated by the electric motor via the final-stage planetary gear mechanism;

a bearing configured to rotatably support the rotary shaft; and a wheel supported by the rotary shaft and configured to engage the driver;

one end of the rotary shaft is in the carrier such that the rotary shaft extends from the carrier in only one direction along an axis of rotation of the rotary shaft; and the one end of the rotary shaft, the carrier and the bearing overlap in a radial direction from the axis of the rotation.

11. The driving tool according to claim 10, wherein the bearing is configured to rotatably support the rotary shaft via the carrier of the final-stage planetary gear mechanism.

12. The driving tool according to claim 10, wherein a distance between the bearing and the carrier of the final-stage planetary gear mechanism is less than a distance between the bearing and the rotary shaft.

13. The driving tool according to claim 10, wherein the bearing directly contacts the carrier of the final-stage planetary gear mechanism.

14. The driving tool according to claim 13, wherein the bearing is spaced apart from the rotary shaft.

15. The driving tool according to claim 13, wherein the bearing directly contacts a ring gear of the final-stage planetary gear mechanism.

16. The driving tool according to claim 10, wherein:

the final-stage planetary gear mechanism is supported by a metal mechanism case; and the metal mechanism case is configured to accommodate the wheel.

17. The driving tool according to claim 10, wherein a ring gear of the final-stage planetary gear mechanism comprises a contact portion that (i) projects from the ring gear in a direction parallel to the axis about which the rotary shaft rotates and (ii) directly contacts an outer ring of the bearing.

* * * * *